United States Patent Office 3,390,986
Patented July 2, 1968

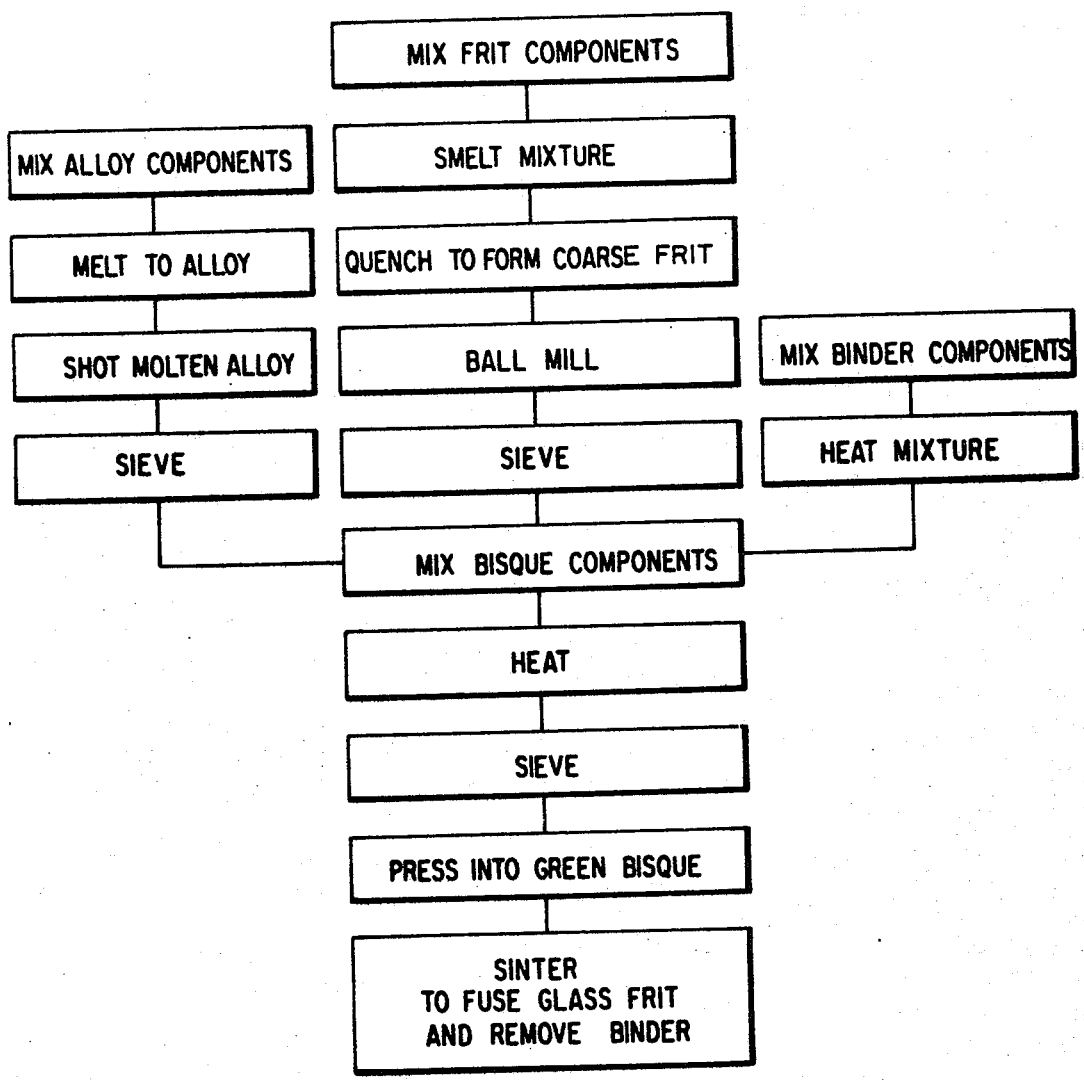

3,390,986
METHOD OF MAKING A BRAZING PREFORM
Randolph N. Stenerson, De Witt, N.Y., assignor to Carrier Corporation, Syracuse, N.Y., a corporation of Delaware
Original application Aug. 30, 1966, Ser. No. 575,999. Divided and this application July 12, 1967, Ser. No. 652,951
2 Claims. (Cl. 75—206)

ABSTRACT OF THE DISCLOSURE

A shaped brazing preform having a configuration adapted to be placed about a metal joint to be formed by heating the brazing preform. The brazing preform comprises a finely divided brazing powder homogeneously suspended in a fused glass matrix. The preform is made by mixing brazing metal powder and glass frit together with a wax binder, pressing the mixture into a desired shape, and thereafter sintering the shape to remove the binder and fuse the glass matrix.

CROSS REFERENCE TO RELATED APPLICATION

This application is a division of co-pending application Ser. No. 575,999, filed Aug. 30, 1966, now Patent No. 3,350,179 entitled, "Brazing Preform."

This invention relates to brazing preforms and more particularly to an improved method of making the same.

Corrosion resistant alloys for brazing steel joints are often brittle and hard to form or use by conventional brazing techniques because they cannot be bent or worked into desired shapes. Consequently, such alloys must be cast or sintered into preforms or powdered and made into slurries or pastes for joint brazing applications. These expedients, however, have serious drawbacks which make them impracticable and results in unsatisfactory joints. For example, direct heating of a cast or sintered preform or of a slurry results in oxidation of the brazing metal which produces internal voids or flaws in the resulting joint. Also, the brazing metal tends to run down the outside of the joint forming members instead of remaining in the joint region. The heating of the brazing alloy may result in loss of the metal due to splattering, and direct flame impingement may cause the brazing metal to be blown away from the joint region so that an unsatisfactory joint is formed. The use of a resinous or other organic binder in a brazing preform causes splattering of the brazing metal away from the joint region due to vaporization or combustion of the binder. Furthermore, resinous binders are often too fragile to be handled easily if they contain a sufficient quantity of brazing metal or else they must be made so large that some of the metal is lost by dripping down the sides of the joint members during heating. When slurries are used, a sufficient clearance space must be allowed between the joint members to hold the slurry which tends to make the resulting joint subject to failure by vaporization or other mechanical stresses. Also, the joint clearance often results in brazing metal disappearing from sight during the brazing so that inspection of the joint during manufacture and after completion is difficult to make.

Accordingly, it is a principal object of this invention to provide an improved brazing preform which overcomes the difficulties encountered with previous joint brazing preforms and techniques.

It is a further object of this invention to provide an improved method of making a brazing preform.

In accordance with this invention, a completely inorganic brazing preform is made which comprises a suspension of a finely divided brazing metal in an inorganic glass matrix having a shape which may generally conform to that of the joint members to be joined.

When the brazing preform in accordance with this invention is positioned adjacent to the joint members to be joined and heat is applied to the members and the preform, the brazing metal powder coalesces and flows within the matrix toward the region of the joint being formed, while the inorganic glass matrix remains about the exterior of the joint region to form a fused glass shield which prevents oxidation of the brazing metal and joint members. The glass shield which is to be formed about the joint during the brazing also prevents splattering of the brazing metal and blowing of the brazing metal away from the joint region.

A brazing preform in accordance with this invention may be suitably made by mixing a finely divided brazing metal powder in suitable proportions with a powdered glass frit and a temporary binder material. The resulting mixture is then compacted to form a green bisque of a shape corresponding generally to that of the joint to be formed. The green bisque is then sintered by heating it to a temperature above the softening temperature of the glass frit and above the ignition point of the temporary binder, but below the liquidus temperature of the brazing metal to completely remove the binder components and to fuse the glass frit into a completely inorganic shaped brazing preform having the finely divided brazing metal particles uniformly suspended therein.

These and other features of this invention will become more readily apparent by reference to the following specification and attached drawing wherein the figure is a flow diagram schematically representing the steps in the manufacture of an improved brazing preform in accordance with this invention.

The method of making the brazing preform, which is schematically illustrated in the drawing, will now be described in detail with reference to a brazing metal alloy which has been found to be particularly corrosion resistant and suitable for joining mild steel tubes for use in an aqua ammonia absorption refrigeration machine. For this purpose, a brazing alloy is compounded which consists of about 50.25% nickel, about 42% iron, about 4.5% silicon, and about 3.25% boron. The iron and nickel form a highly corrosion resistant alloy, the silicon is added for melting point depression and the boron is added to provide both melting point depression and self-fluxing of the brazing alloy and of the joint members. The quantities of the alloy constituents can vary by about plus or minus 10% of the nominal amounts specified and still provide a satisfactory corrosion resistant brazing alloy for steel tubing.

The weighed constituents of the brazing alloy are placed in a suitable vessel and heated to a temperature of about 2800° F. The alloy is then shotted by pouring the molten alloy into a jet of cold water which results in solidification of the alloy into small spherical or globular particles. These cooled alloy particles are then sieved through a 150 mesh screen to provide the desired powdered brazing alloy metal.

The glass matrix is formed by mixing the desired basic frit components together and smelting them to form a fused amorphous glass composition. The preferred glass composition is made by mixing about 28.78% dehydrated borax ($Na_2B_4O_7$) with about 40.11% silica ($SiO_2$) and about 31.11% whitening (CaO). The resultant glass after smelting contains about 10.3% sodium oxide ($Na_2O$), about 20.1% calcium oxide (CaO), about 23.1% boron oxide ($B_2O_3$) and about 46.5% silicon dioxide ($SiO_2$). The preferred composition, however, can be substantially altered to provide desired characteristics. For example, the sodium oxide could be replaced in an amount up to about 10% with either or both potassium oxide ($K_2O$) or lithium oxide ($Li_2O$). The calcium oxide could be replaced in equal amounts with either barium oxide (BaO) or strontium oxide (SrO). Similarly, the total boron oxide content of the glass could be varied between about 20% to about 30% by adjusting the quantity of silicon dioxide between about 40% to about 50% in the composition. The boron oxide acts as a powerful brazing metal fluxing agent in the molten glass phase to improve the integrity of the resulting brazed joint and therefore borosilicate glasses are preferred as the matrix glass.

After smelting of the glass constituents at about 2,550° F., the molten glass is quenched by being poured into cold water to produce a coarse frit. The coarse frit is then milled in a horizontal rotating ball mill and sieved through a 400 mesh screen to provide the desired glass frit for subsequent formation of the brazing preform.

A temporary binder material is prepared by dissolving about 10% by weight of carnauba wax and about 10% by weight of paraffin into about 80% by weight of trichloroethylene. The solution is heated in a hot water bath to completely dissolve the wax and paraffin in the solvent.

About 77.7% by weight of the screened brazing alloy powder is then mixed with about 19.4% by weight of the screened glass frit and about 2.9% by weight of the solvent containing the wax and paraffin binder. For a ⅜ inch inside diameter brazing ring, the quantity of brazing alloy employed may be about .7 gram. This mixture is throughly mixed and may be heated in a hot water bath to vaporize the solvent from the binder components until the mixture reaches the consistency of "green sand" used in casting. The temporary binder holds the particles of brazing alloy and glass frit together in a homogeneous mixture and prevents separation of them which would otherwise result during handling because of their substantially different densities. Also, the temporary binder acts as a lubricant to facilitate the pressing of the mixture in a pressing die.

The mixture of frit, alloy and temporary binder is then successively passed through a 14 and a 28 mesh sieve and placed in a pressing die of a shape and size similar to that of the joint to be brazed. It has been found that a ratio of about one part by weight of glass frit and about four parts by weight of brazing metal powder produces a pressed green bisque having satisfactory mechanical strength for subsequent processing while at the same time not exhibiting excessive shrinkage when made into the final brazing preform. However, these ratios can be substantially varied to suit a particular joint forming application.

The mixture of brazing alloy, glass frit, and temporary binder is then compacted in the pressing die at a pressure of preferably about 100,000 pounds per square inch to form a green bisque. It has been found that the pressure at which the bisque is formed has a material effect on mechanical characteristics of the resulting brazing preform. If less than about 50,000 pounds per square inch of pressure is employed at this stage, the resulting brazing preform may have unsatisfactory resistance to thermal shock during rapid heating of the brazed joint.

The green bisque is then sintered or cured to fuse the glass frit particles and to completely remove the temporary binder from the preform. The sintering temperature should be above the softening point or temperature of the glass frit to provide adequate fusing and above the ignition temperature of the constituents of the temporary binder to assure complete removal of all of the binder from the preform so that a completely inorganic preform results. Preferably, the ignition temperature of the binder is below the softening point of the glass to assure complete removal of the binder during sintering. At the same time, it is desirable that the sintering temperature be below the liquids temperature of the brazing metal alloy and preferably below its solidus temperature to prevent migration of the metal alloy particles within the matrix during the fusing of the glass frit. The brazing alloy described herein has a solidus temperature of about 1790° F. and a liquidus temperature of about 1885° F. It is preferred to sinter the green bisque described at about 1350° F. to about 1400° F. for a period of about 60 seconds plus or minus 5 seconds. If the sintering operation is carried on for an excessive period of time, the shrinkage of the resulting brazing preform will be greater and the dimensions of the green bisque must be correspondingly altered to compensate for this shrinkage. On the other hand, if the sintering temperature is excessively short, the resulting preform may be excessively fragile and difficult to handle during the brazing operation.

It will be understood that variations may be made in the composition of the brazing metal, the glass frit, and the binder material to provide a brazing compact which is most suitable for a particular application. For example, an alloy of 95% zinc and 5% aluminum could be employed as the brazing metal in a glass matrix to form a brazed aluminum joint. Variations in the composition and softening point of the glass matrix employed may be utilized within the scope of this invention to adapt the brazing preform to various brazing temperatures and various brazing metals. This invention may be used to make metal joints at temperatures as low as about 700° F. by use of suitable alloys and glasses. Likewise, various other inorganic fluxes may be added to the glass matrix to adapt the brazing technique to the metals being joined. However, it should be noted that the matrix must be an inorganic fused amorphous composition having the brazing alloy suspended therein and that ceramic compositions are not suitable for the purpose of this invention. Also, various heating methods may be used in the brazing operation such as furnace brazing, if desired.

By the practice of this invention, previously encountered problems of splattering, sputtering, or blowing of the brazing material from the joint are completely overcome. In addition, oxidation of both the joint and the brazing alloy is greatly reduced and is not a problem. Consequently, a more uniform, consistent joint is formed which is more free of voids or other flaws than possible by prior brazing methods. Similarly, the lack of volatile organic material in the preform eliminates the problem of explosion of the alloy from the region of the joint. The formation of the protective glass coating about the joint also tends to direct and confine the flow of brazing alloy into the joint clearance. The joint clearance may be of capillary size for good structural rigidity and resistance to vibration or other forms of applied stress. The ease of assembling and transporting subassemblies prior to brazing is facilitated because a large or specially shaped joint is not required to retain the brazing alloy prior to brazing. Likewise, many of the unpredictable human factors in making the joint are reduced to a minimum and the method can be adapted to automated brazing apparatus. The joint may also be easily visually inspected for physical defects and to assure that the brazing temperature, time and other conditions are optimum for the joints being made.

A preferred embodiment of this invention has been described for purposes of illustration, and it will be appreciated that this invention will be otherwise embodied within the scope of the following claims.

I claim:

1. A method of making a brazing preform for forming a brazed metal joint by depositing brazing metal onto adjacent joint members upon heating of the brazing preform, which comprises the steps of:
   A) mixing together a predetermined quantity of a brazing metal powder and a powdered glass frit having a softening temperature below the liquidus temperature of said brazing alloy;
   B) placing the mixed brazing metal powder and powdered glass frit in a die, and pressing and shaping the mixed powder into a desired form under a pressure in excess of about 50,000 pounds per square inch to compact the mixed powder into a desired form and to compact the form sufficiently to subsequently make a sintered preform capable of withstanding thermal shock during brazing of a joint; and (C) fusing the powdered glass frit while maintaining said metal powder in finely divided dispersed particulate form distributed through the fused glass by sintering the pressed form at a temperature above the softening point of the glass and below the liquidus temperature of the brazing metal, thereby forming a rigid brazing preform consisting essentially of an inorganic fused glass matrix having suspended therein the brazing metal powder in unsintered particulate form, said sintered preform having sufficient mechanical rigidity to withstand the thermal shock of being subjected to heat sufficient to melt the brazing metal during use of the brazing preform in brazing a joint.

2. A method of making a brazing preform as defined in claim 1 which includes the steps of mixing a temporary binder material with said glass frit and brazing metal prior to pressing of the mixture, and removing said temporary binder from the pressed mixture during the sintering operation by sintering the pressed mixture at a temperature above the ignition temperature of the temporary binder.

References Cited

UNITED STATES PATENTS

| | | | |
|---|---|---|---|
| 3,123,470 | 3/1964 | Denison | 75—201 |
| 3,165,821 | 1/1965 | Breton | 75—206 X |
| 3,206,702 | 9/1965 | Greenwood | 29—260 X |
| 3,274,669 | 9/1966 | Place | 29—260 |
| 3,326,645 | 6/1967 | Counts | 75—200 X |
| 3,326,677 | 6/1967 | Rubel | 75—201 |

FOREIGN PATENTS

| | | |
|---|---|---|
| 712,082 | 7/1954 | Great Britain. |
| 715,528 | 9/1954 | Great Britain. |

CARL D. QUARFORTH, *Primary Examiner.*

A. J. STEINER, *Assistant Examiner.*